Figure 1:
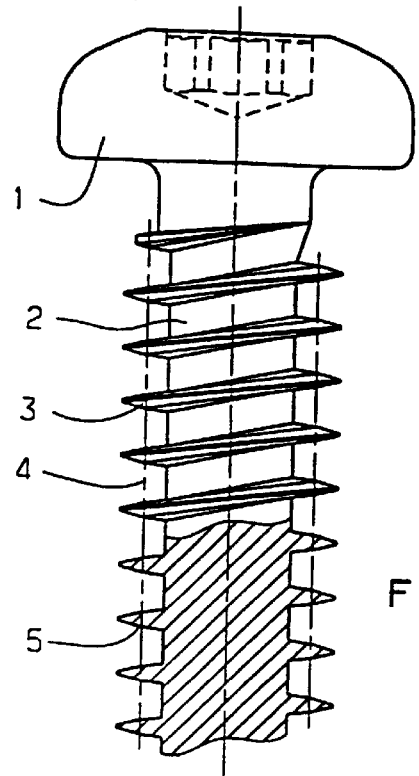

United States Patent
Grossberndt et al.

Patent Number: 6,158,939
Date of Patent: Dec. 12, 2000

[54] SELF TAPPING SCREW

[75] Inventors: Herman Grossberndt; Gottfried König, both of Bad Laasphe, Germany

[73] Assignee: EJOT Verbindungstechnik GmbH & Co. KG, Germany

[21] Appl. No.: 09/269,472
[22] PCT Filed: Jul. 28, 1998
[86] PCT No.: PCT/EP98/04719
§ 371 Date: Jun. 14, 1999
§ 102(e) Date: Jun. 14, 1999
[87] PCT Pub. No.: WO99/06715
PCT Pub. Date: Feb. 11, 1999

[30] Foreign Application Priority Data

Jul. 29, 1997 [DE] Germany ............ 197 32 652
Jul. 29, 1997 [DE] Germany ............ 197 32 636

[51] Int. Cl.⁷ .................... F16B 35/04; F16B 25/00
[52] U.S. Cl. .................... 411/411; 411/387.4
[58] Field of Search ............ 411/411, 414, 411/416, 386, 387.1–387.8, 308–311

[56] References Cited

U.S. PATENT DOCUMENTS

| | | |
|---|---|---|
| 1,526,182 | 2/1925 | Rosenberg . |
| 2,380,724 | 7/1945 | Crooks ............... 411/414 |
| 3,083,609 | 4/1963 | Lovisek ............... 411/386 |
| 3,323,402 | 6/1967 | Gowen ............... 411/411 |
| 3,878,759 | 4/1975 | Carlson . |
| 4,161,132 | 7/1979 | Eklund . |
| 4,536,117 | 8/1985 | Yamashiro . |
| 4,549,754 | 10/1985 | Saunders ............... 411/411 |
| 4,810,149 | 3/1989 | Lee ............... 411/411 |
| 4,850,775 | 7/1989 | Lee ............... 411/411 |
| 5,061,135 | 10/1991 | Pitchard . |

FOREIGN PATENT DOCUMENTS

| | | |
|---|---|---|
| 102605 | 3/1984 | European Pat. Off. . |
| 104552 | 4/1984 | European Pat. Off. . |
| 0133773 | 3/1985 | European Pat. Off. . |
| 133773 | 3/1985 | European Pat. Off. . |
| 476831 B1 | 3/1992 | European Pat. Off. . |
| 876474 | 11/1942 | France ............... 411/411 |
| 79 25 469 | 12/1979 | Germany . |
| 27 54 870 C3 | 3/1981 | Germany . |
| 31 14138 A1 | 10/1982 | Germany . |
| 3114138 | 10/1982 | Germany . |
| 31 17624 C2 | 1/1983 | Germany . |
| 3615271 | 11/1987 | Germany ............... 411/411 |
| 40 03 374 C1 | 5/1991 | Germany . |
| 44 39 535 A1 | 5/1996 | Germany . |
| 4439535 | 5/1996 | Germany . |
| 177031 | 3/1922 | United Kingdom . |
| 976849 | 12/1964 | United Kingdom . |
| 1120991 | 7/1968 | United Kingdom . |
| WO 99/06715 | 7/1998 | WIPO . |

*Primary Examiner*—Flemming Saether
*Attorney, Agent, or Firm*—Banner & Witcoff, Ltd.

[57] ABSTRACT

A cold-rolled screw which is intended for screwing into plastic has a narrow self-tapping thread with an inflection on at least one side of the thread so that the inner flank angle is smaller than the outer flank angle but still approximately equal to or larger than one third of the outer flank angle. In a second aspect, the screw thread has a end surface spaced from the free end of the screw to guide the plastic displaced by the thread during threading of the screw.

13 Claims, 3 Drawing Sheets

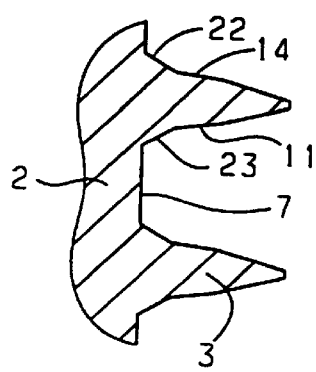
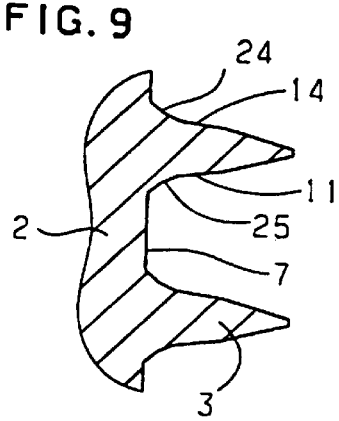
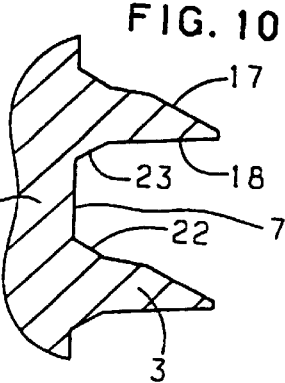
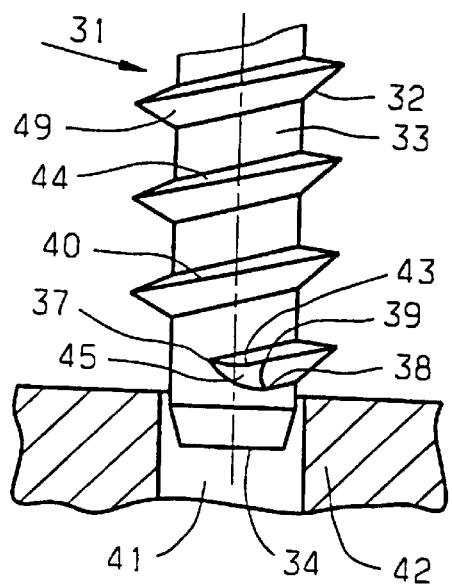
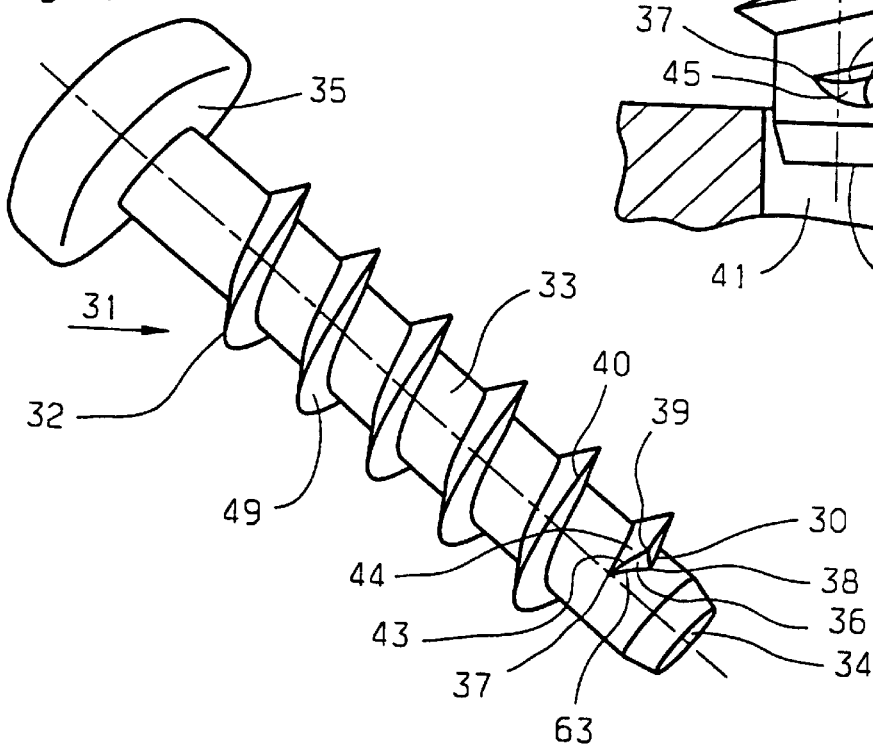

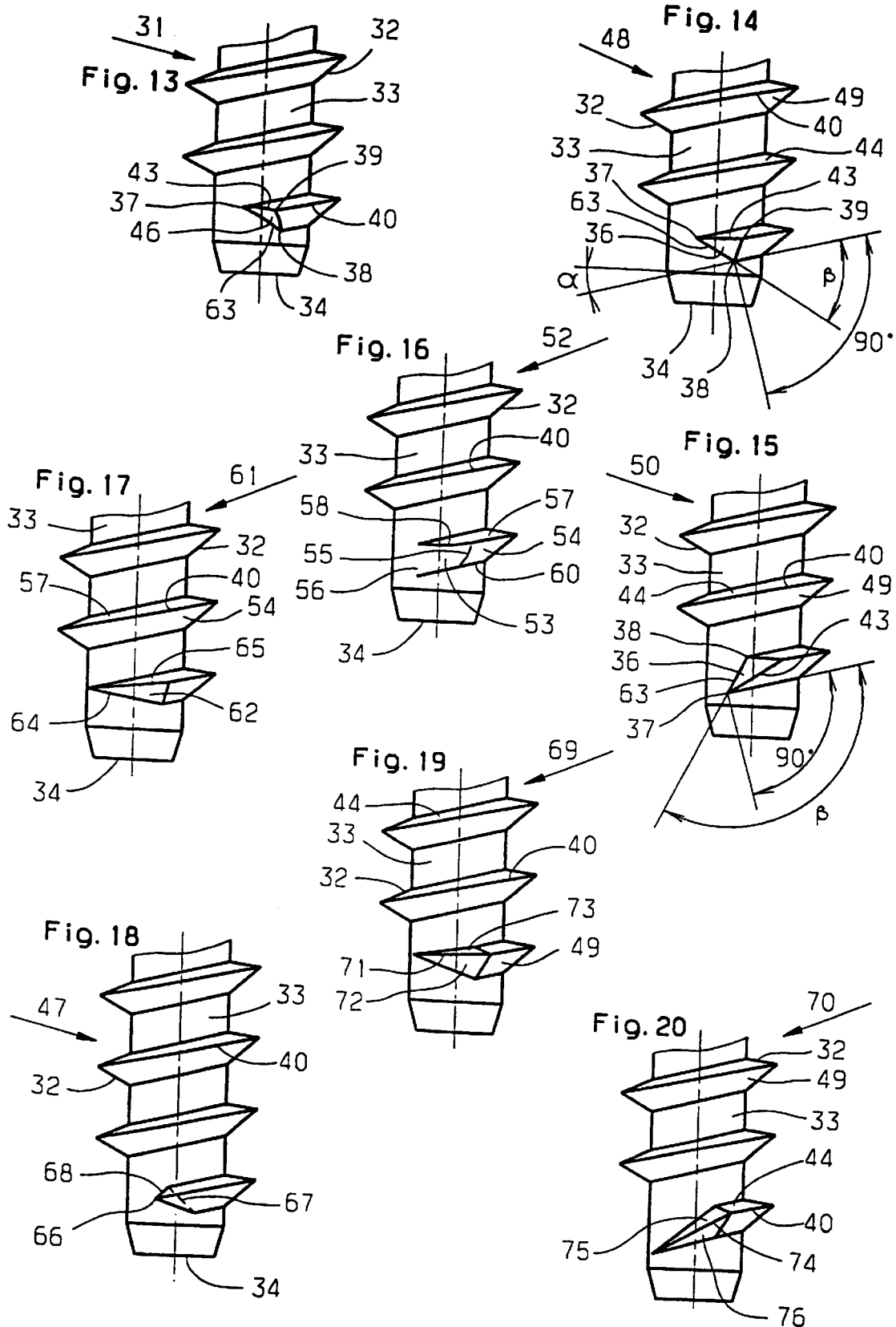

SELF TAPPING SCREW

FIELD OF THE INVENTION

The invention relates to a cold-rolled screw which is intended for screwing into plastic, has a self-tapping thread and of which the thread turns are configured approximately in the manner of knife blades in cross section. The invention also relates to such a screw in which the free end of its shank forms a guide for screwing the screw into a bore.

BACKGROUND AND SUMMARY OF THE INVENTION

Such screws are widely used. As an example, you are referred to the screw according to German Patent 27 54 870. When such a screw is screwed into plastic, the latter is displaced by the thread turns penetrating into the plastic, for which purpose the thread cross section has to provide a sufficient clearance, to be precise a spacing between a screw-receiving bore and the core diameter of the screws. In the case of the known screw, this is also achieved in that the thread root has a narrowed fraction. This means that the plastic material displaced by the thread has to cover the distance between that region of the thread turn which has penetrated into the plastic and the thread root. In this case, the displaced plastic material loses the direct, intimate contact with the undisplaced plastic material, this reducing its capability of contributing to the drawing-out force. The drawing-out force is to be understood as that force which is necessary for pulling out the screwed-in screw.

Furthermore, EP Patent 133 773 describes a screw which is intended for screwing into plastic, has a self-tapping thread and in the case of which, for the purpose of increasing the release torque, the thread flanks, in axial section are rectilinear on one side and are provided with an outwardly directed inflection on the other side. With this thread configuration, it is not possible, during displacement of the plastic, to counteract the loss of contact between displaced and undisplaced plastic. Furthermore, EP Patent 476 831 likewise presents a non-symmetrical configuration of the thread of a screw which is intended for screwing into plastic and has a self-tapping thread, it being the case that this configuration results in the thread turns, in axial section, being rectilinear on one side and being allowed to run in arculate form into the thread root on the other side, the flank angle of the thread thus increasing constantly in the region of the arc. This is intended to improve the displacement of the plastic material with the effect of increasing the drawing-out force.

You are additionally referred to German Utility Model 79 25 469, which discloses a welding tip which is provided with a thread and in the case of which the thread serves for pressing a workpiece, which is provided with an opening, onto the welding tip and for securing the workpiece in that sharp-edged thread crests press into the material of the workpiece and secure the latter against a drawing-out force. In the case of the known welding tip, the thread is provided with sharp edges in that a peripheral phase [sic] is pressed laterally onto the thread crest, said phase [sic] merging with a sharp-edged formation into one thread flank. This necessarily gives a particularly large flank angle of approximately 75° on the thread crest. This configuration means that the thread provided on the known welding tip is not suitable for a screw which is intended for screwing into plastic and has a self-tapping thread since screws for screwing into plastic only ensure a sufficient penetration depth of the thread turns when the cross section of the thread turns is designed approximately in the manner of knife blades (see above-mentioned German Patent 27 54 870).

European Patent Application 102 605 presents a thread form which is similar to the configuration of German Utility Model 79 25 469, is intended for a wood screw, but does not have a sharp-edged thread crest, and thus does not have any properties which could make it suitable for screwing into plastic.

The object of the invention is for the self-tapping thread of a cold-rolled screw to be configured, in terms of the axial section through the thread turns, such that the plastic material which is displaced when the screw is screwed into plastic can flow away in a particularly favourable manner.

This is achieved according to the invention in that a flank surface of the thread turns has an inwardly directed inflection approximately in the central third and forms an outer flank angle of approximately 30° (between the inflection and the thread crest) and an inner flank angle (between the inflection and the thread root), it being the case that the inner flank angle, on average, is essentially equal to or greater than ⅓ of the outer flank angle.

On account of the inwardly oriented inflection of the flank surface of the thread turns, the plastic material which is displaced by the thread turns is displaced into the region of the inner flank angle, it being the case that this region, on account of the inwardly oriented inflection and the clearance which thus extends relatively far outwards, directly adjoins the displaced plastic material protruding convexly from the bore wall without any material accumulation, with the result that the displaced plastic material, on account of the short displacement distance, is only heated to a minimal extent and remains in direct intimate contact with the undisplaced, and thus unimpaired plastic material. This means that this displaced plastic material, which largely maintains its properties, in the region of the inner flank angle can counteract the drawing-out force and thus makes a significant contribution to the loading capacity of the relevant screw connection.

It is possible for the inflection to be provided in each case just on one flank surface of a thread turn, in which case, over the entire thread, the inflection is arranged on one side throughout. However, it is also possible for the inflection to be provided in each case on both flank halves of a thread turn. The arrangement of the inflection on just one flank surface depends on the plastic material into which the relevant screw is to be screwed. If the plastic material is heat-sensitive, then the inflection is advantageously arranged on that flank surface which is directed away from the screw head (rear flank). In this case, there is a deformation of plastic material essentially on the side of the rear flank where the deformed plastic material flows into the clearance provided by the inflection, with the result that on the flank surface which is directed towards the screw head (load flank) there is largely unheated plastic material for absorbing the forces acting on the screw. If, on the other hand, the plastic material is temperature-resistant (as is the case, in particular, as a result of glass-fibre reinforcement), then the inflection is advantageously arranged on the load flank since, in this case, plastic material which is displaced when the screw is screwed in is accumulated to a considerable extent in front of the load flank, said plastic material, on account of its quantity and, if appropriate, as a result of the reinforcement provided by its filler, then withstands particularly well the loading to which it is subjected by the screw.

The outer flank angle may bound the thread turns symmetrically or non-symmetrically in axial section. A symmetrical boundary is favourable for the production of the rolling jaws necessary for the cold-rolling operation; a non-symmetrical boundary gives increased drawing-out forces in the case of certain plastic materials.

The configuration of the flank surfaces in the region of the inner flank angle may be selected such that the flank surfaces run rectilinearly or in a concavely curved manner from the inflection in axial section. The selection of this configuration depends on the plastic into which the screw is to be screwed.

As far as the configuration of the inner flank angle of the thread turns is concerned, it is also possible for said angle to bound the thread turns symmetrically or non-symmetrically in axial section. The selection of this boundary likewise depends essentially on the plastic into which the screw is to be screwed.

In order to increase the stability of the thread turns and to improve the material flow during the production of the screw by cold rolling, the screw is expediently configured such that the flank surfaces in the region of the thread base merge into the thread root in the form of a widening of the thread base, the inner flank angle being increased in the process. In this case, the widening forms a flank angle which, on average, is greater than the outer flank angle. It is possible here for the widening to run rectilinearly in axial section, but it is also possible for the widening to run in a concavely curved manner in axial section.

It is expedient for the configuration of the screw and the plastic material and the diameter of the screw-receiving bore to be coordinated with one another, for which purpose it is possible to use a series of different shapings, as described above by way of example. It is to be ensured here that, when the screw has been screwed in, the inflection in the flank surfaces is enclosed by plastic material. The inflection is expediently located at a diameter which is approximately equal to or greater than the bore diameter. For this purpose, a position of the inflection approximately in the centre of the flank surfaces has proven favourable. In this case it is possible, also for the purpose of facilitating the screw production, for the inner flank angle to be selected such that the latter is equal to or greater than half the outer flank angle, provided the resulting clearance is of a sufficient size for the displaced plastic to flow in.

A further known screw which is widely used is disclosed in German Patent 31 17 624. The known screw has a thread which tapers conically to a point, this being intended to facilitate the operation of screwing the screw into a workpiece. This is because, when the screw is screwed in, there is a transition from the lesser thread diameter to the full thread diameter, as a result of which the screw can be screwed in first of all with a small amount of force, whereupon, as the screwing-in operation continues, the full widening of the cut thread is to be made possible with a relatively low torque. The disadvantage of this screw configuration is that during widening of the thread, along the conical region of the thread, the workpiece is subjected to a considerable radial pressure, which cannot always be readily absorbed by the relevant material. It is thus also known to have thread forms where the thread end can terminate with decreasing height of the thread turn, the thread vertex finally reaching the external diameter of the shank, which corresponds to the thread root. Such a configuration is disclosed in German Patent 40 03 374. According to British Patent 976 849, a further configuration of a screw with a self-tapping thread consists in that axial grooves are made in the region of the thread end, with an external diameter which is smaller than the load-bearing thread region, said axial grooves allowing sharp-edged teeth to project from the thread as in the case of a screw tap. This configuration of the screw means that the latter is itself capable of cutting, with chip formation, a thread of reduced external diameter, which it then definitively widened by the load-bearing thread region.

The invention also has the object of providing a screw which corresponds to the definition given in the introduction and which performs the thread-cutting operation with the avoidance of chip formation and forms the thread in the material of the relevant workpiece such that the material is, as it were, divided by the thread of the screw and pushed away in a controlled manner to produce a thread groove.

This is achieved according to the invention in that the thread end is formed by an end surface which truncates the thread turn of the thread end, is directed obliquely with respect to the cross section of the screw and has a cutting edge and a base line, which continues the thread-base edge between one thread flank and the lateral surface of the shank, it being the case that the base line runs at an angle $\beta$, which differs considerably from 90°, with respect to the direction of slope (lead angle $\alpha$) of the thread and the cutting edge emerges into the thread vertex.

When the free shank end of the thread is introduced into the bore of a workpiece, the leading end of the thread turn presses into the material of the workpiece by way of its end surface, it being the case that, on account of the angle $\beta$ maintained by the base line and of the resulting inflection of the cutting edge with respect to the thread vertex, the end surface cuts open the material of the workpiece, to be precise with the cutting edge, which merges into the thread vertex. This results in a displacement of the material, which is pushed away laterally essentially just on the side of the end surface, i.e. just on the side of one thread flank, while such a displacement does not take place in practice on the side of the other thread flank. As the threads turn cuts in, its region which adjoins the end surface obtains the necessary clearance for the rest of the screwing-in operation of the thread, the material of the workpiece pressing flush against the thread-turn flank which is located opposite the end surface. Depending on the application, this has a favourable effect on the pulling-out forces. This is also basically attributable to the fact that, by virtue of the division of the material of the workpiece, the material on the side of one thread flank, as a result of material displacement being prevented there, virtually fully maintains its structure and, consequently, its inner strength. The cutting edge of the end surface thus acts like a cutter.

The end surface may advantageously be configured essentially as a triangle, of which the base, running between its base points, is formed by the base line and the vertex coincides with the thread vertex.

As has been described above, the triangular end surface is positioned obliquely with respect to the cross section of the screw. It is possible to select different oblique positions, that is to say either such that the vertex of the triangle follows or precedes the base line in the screwing-in direction of the screw. The first case gives greater design freedom as far as the end surface is concerned since in this case the [sic] extends, as it were, on the outside of the last thread turn. In the case of the vertex preceding the base line, the end surface forms in the end of the thread something of an undercut, which cannot be of just any depth. Said end surface is expediently of planar configuration. However, it is also possible for the end surface to be of curved, to be precise convex or concave, configuration if this results in a more favourable push-away action of the material. In this case, it is also possible for the curvature to be spherical.

A further possible configuration of the end surface consists in allowing the latter to extend in a helical configuration from one thread flank, to be precise such that the end surface then runs flat into the lateral surface of the shank.

In order to facilitate production of the screw, the end surface is expediently provided with a considerable length, in particular the end surface extends over at least ¼ of a thread turn. A correspondingly long cutting edge is also obtained in this case, this making it easier to cut open the material.

There are basically two possibilities for the oblique position (angle β) of the end surface with respect to the direction of slope of the thread. On the one hand, it is possible to select the angle β such that it is considerably less than 90° (less than 75°). In this case, the end surface subjects the material of the workpiece to a pressure which is oriented in the direction of the screw end, that is to say there is a compression of the material on the so-called rear flank, which is located opposite the load flank. The load flank of the thread is that flank which, when the screw has pulling-out forces acting on it, absorbs these forces. These pulling-out forces run axially from the screw end to the screw head and cause the screw to be pulled out of the workpiece in this direction. The accumulation of displaced material on the rear flank, which is equivalent to the material of the workpiece on the side of the load flank remaining virtually unimpaired by the screw being screwed in, gives more resistance to the pulling-out forces, in particular when the screw is screwed into plastic, than deformed material on the side of the load flank, so that this alignment of the end surface, as tests have shown, results in greater pulling-out forces than does the opposite alignment of the end surface. If, on the other hand, the angle β is selected such that it is considerably greater than 90° (greater than 105°), then the material coming into contact with the end surface is pushed away from the screw end by said end surface, that is to say there is a material accumulation on the load flank.

The end surface can be configured by various production processes, in particular by cutting or non-cutting forming.

BRIEF DESCRIPTION OF THE PREFERRED EMBODIMENTS

Figure 2:
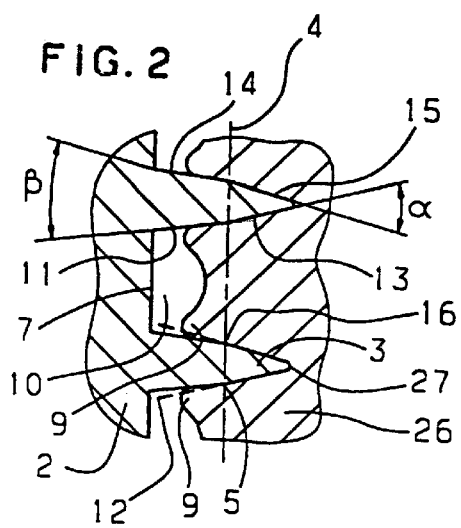
Figure 3:
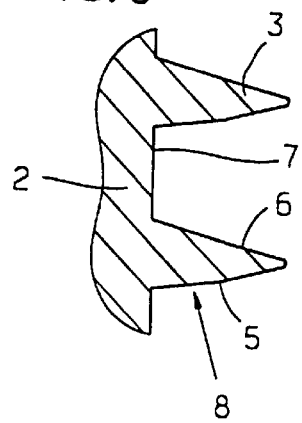
Figure 4:
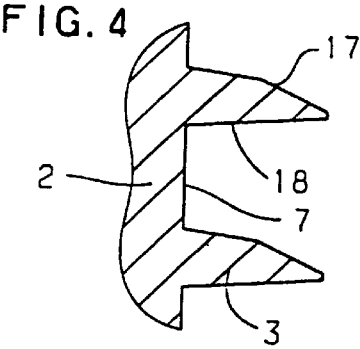
Figure 5:
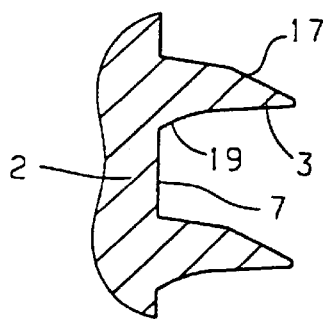
Figure 6:
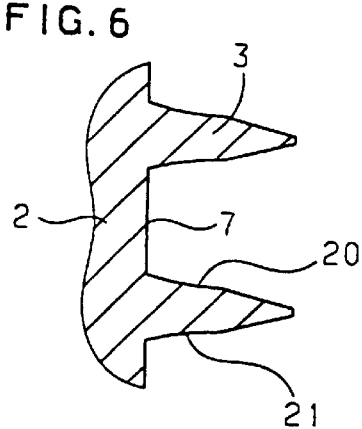
Figure 7:
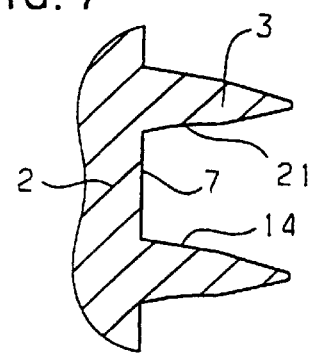

Exemplary embodiments of the invention are illustrated in the figures, in which:

FIG. 1. shows a screw in section,

FIGS. 2–10 show enlarged cross sections of specially configured screw turns, to be precise, FIG. 2 shows thread turns in which both flank surfaces of a thread turn contain an inflection, the receiving plastic material also being shown, FIG. 3 shows thread turns with an inflection on just one flank surface, FIG. 4 shows thread turns with an inflection on just one flank surface and a non-symmetrical outer flank angle, FIG. 5 shows a modification of the configuration according to FIG. 4 with a non-symmetrical inner flank angle, FIG. 6 shows thread turns with, in axial section, concavely curved, symmetrical flank surfaces in the region of the inner flank angle, FIG. 7 shows thread turns with non-symmetrical flank surfaces in he region of the inner flank angle, FIG. 8 shows thread turns with a widening of the inner flank angle in the region of the thread base, FIG. 9 shows a modification of the arrangement according to FIG. 8 with concave widening, FIG. 10 shows thread turns with a widening of the flank surfaces in the region of the thread base in conjunction with a non-symmetrical outer flank angle, FIG. 11 shows a perspective view of a screw in which the free shank end forms a guide for the operation of screwing in the screw and which has a planar end surface, FIG. 12 shows the screw, likewise in a perspective with a convexly curved end surface, FIG. 13 shows the same screw with a concavely curved end surface;

FIG. 14 shows the screw with a base line which is inclined in relation to the direction of slope, as a result of which the end surface is directed such that, during the screwing-in operation, it displaces the material in the direction of the screw end, FIG. 15 shows the same screw but with the end surface in the opposite direction, said end surface, when the screw is screwed in, displacing the material away from the screw end, FIG. 16 shows the screw with a helical end surface, FIG. 17 shows the screw with a relatively long end surface, FIG. 18 shows the screw with a leading vertex, FIG. 19 shows the screw with a bent end surface, and FIG. 20 shows a variant of the screw according to FIG. 19.

FIG. 1 illustrates a cold-rolled screw with the screw head 1 and the screw shank 2, which has the thread turns 3. As far as the cross section of the thread turns 3 is concerned, you are referred to the explanation relating to FIG. 2. The inner wall of a bore in a plastic part is also indicated in FIG. 1, by the chain-dotted lines 4. It can be seen from the position of the chain-dotted lines 4 that the thread turns 3 have more than ⅓ of their height penetrating into the material of a plastic part (not illustrated). In this case, the line 4 more or less intersects the location of the inflection 5 (see FIG. 2) in the flank surface of the thread turns 3. It should be pointed out, however, that it is also possible to select a different position for the line 4, which illustrates the wall of a bore, this position depending on the relevant plastic material into which the screw is to be screwed.

FIG. 2 illustrates thread turns 3 which are configured symmetrically in axial section, this resulting from the fact that both the flank surface 14/15 and the flank surface 11/13 are provided with an inflection, namely the inflection 16 and the inflection 5. The inflection 5 and the inflection 16 form the boundary between the outer flank angle α (between the inflection 5 or 16 and the thread crest 27) and the inner flank angle β (between the inflection 5 or 16 and the thread root 7). Both the outer flank angle α and the inner flank angle β bound the thread turns 3 symmetrically. It can also be seen from FIG. 2 how the thread turns 3 penetrate into the plastic material 26 belonging to some component. This penetration of the thread turns 3 results in the formation of the beads 9 alongside the thread flanks 14/15 and 11/13. In this case, the plastic material 26 is displaced in the direction of the thread root 7, the narrowness of the thread turns 3 resulting in just minimal displacement of the plastic material 26. The inflection of the thread flanks 14/15 and 11/13 approximately in the region of the line 4 results in an additional clearance on both sides, which is indicated by the dashed line 12. The dashed line 12 forms the imaginary continuation of the flank surfaces 13 and 15 in the region of the inner flank angle β. The clearance 10, which is provided between the thread root 7 and the beads 9, is correspondingly increased in size by the inflection of the flank surfaces 13 and 15, i.e. the transition into the smaller flank angle β.

FIG. 3 illustrates a shaping of the thread turns 3 which is modified with respect to the configuration according to FIG. 2. According to FIG. 3, the thread turns 3 are configured non-symmetrically in axial section, which results from the fact that the flank surface 6 runs rectilinearly throughout as far as the thread root 7, while the other flank surface 8 has the inflection 5.

FIG. 4 shows a further modification of the illustration according to FIG. 3. FIG. 4 has thread turns 3 in which one flank surface 18 runs rectilinearly and the other flank surface 17 runs with an inflection, the difference from FIG. 3 being that the non-symmetry is in the region of the outer flank angle α.

FIG. 5 shows a modification with respect to the configuration according to FIG. 4, to be precise the thread turns 3 according to FIG. 5 are provided, on one side, with a concave curve 19 in the region of the inner flank angle β. Apart from this, the thread turns 3 according to FIG. 5 correspond to those according to FIG. 4.

The thread according to FIG. 6 is similar to that according to FIG. 2, to be precise it has a symmetrical outer flank angle a and concavely running curves 20 and 21 in the region of the inner flank angle β.

FIG. 7 shows a modification of the illustration according to FIG. 6, the thread turns 3 being provided with just one concavely running curve 21 in the region of the inner flank angle β. On the opposite side of the thread turns 3, the latter have a rectilinearly running flank surface 14 in the region of the inner flank angle β, i.e. in this respect the configuration according to FIG. 7 corresponds to the configuration according to FIG. 2.

FIG. 8 shows a modification of the configuration according to FIG. 2. The screw according to FIG. 8 has the widenings 22 and 23, which run rectilinearly in each case here, in the region of the thread base. The widenings 22 and 23 may also be of concavely curved design. This is shown in FIG. 9, which illustrates a screw with the thread turns 3 in which the transition into the thread base runs in concave curves 24 and 25 on both sides of the thread turn 3.

FIG. 10 shows a configuration, similar to that according to FIG. 4, with an asymmetrical outer flank angle a, the transitions into the flank base being designed in each case as a rectilinearly running widening 22 and 23.

It should also be pointed out that the non-symmetry in the region of the outer flank angle may also be provided in the region of the inner flank angle, as already specified above, and in this case may relate, if appropriate, to widenings provided in the region of the thread base.

Particularly suitable for soft plastics is a screw according to the invention in the case of which, within the range of variation of the flank angle of approximately 30°, the value selected results in particularly acute-angled thread turns, namely with a flank angle of approximately 25°.

FIG. 11 shows a cold-rolled screw 31 with the self-tapping thread 32 which extends over the shank 33 of the thread [sic] and terminates before the end 34 of the shank 33. On the side located opposite the end 34 of the screw 31, the latter has the screw head 35.

The thread 32 is formed here by a single, continuous thread turn which terminates in the region of the end 34 of the shank 33. This end of the thread 32 is formed by the end surface 36 (see FIG. 14) which runs obliquely with respect to the direction of slope of the thread 32 and is of essentially triangular configuration. The end surface 36 extends between the base points 37 and 38 (base line 63) on the lateral surface of the shank 33 and the vertex 39, which coincides with the thread vertex 40. The end surface 36 may also be used in the case of multi-turn threads.

When the screw 31 is screwed into a bore 41 of a workpiece 42 (see FIG. 12 in this respect), the end surface 36 (or 45 in FIG. 12) comes into contact with the material of the workpiece 42 and presses into the same, for which purpose the material has to be able to yield correspondingly. This material may be, for example, plastic, relatively soft metal or the like. In this case, the end surface 36 uses its cutting edge 43, running between the points 37 and 39, to split open the workpiece material, which, on account of the oblique position of the end surface 36 provided here, is displaced onto the side of the rear flank 49, while the undeformed material is positioned against the load flank 44 of the thread 32, said load flank being directed towards the screw head 35. In this way, that end of the thread 32 which is provided with the end surface 36 cuts into the workpiece a female thread, into which the parts of the thread 32 which follow the end surface 36 then slide.

In the case of the exemplary embodiment according to FIG. 11, the end surface 36 is designed as a planar surface, but it may also have a convex curve (end surface 45 in FIG. 12) or concave curve (end surface 46 in FIG. 13).

Contrasting effects of the screw are explained by way of FIGS. 14 and 15.

FIG. 14 depicts the lead angle α of the thread. In this case, the end surface 36 is positioned such that the line connecting the base points 37 and 38 (base line 63) forms an angle β, with respect to the direction of slope of the screw 48, which is less than 90°. As a result, the illustration in FIG. 14 thus corresponds to the illustrations of the screws according to FIGS. 11 to 13. As explained above, this configuration means that, when the screw 48 is screwed in, the end surface 36 displaces material onto the rear flank 49 of the thread 32, said rear flank being located opposite the load flank 44.

In the case of the screw 50 according to FIG. 15, the end surface 36 has a different oblique position. In this case, the line connecting the base points 37 and 38 (base line 63) of the end surface 36 runs at an angle β, with respect to the direction of slope of the screw 50, which is greater than 90°. When the screw 50 is screwed in, the end surface 36 pushes the material onto the side of the load flank 44.

The screw 52, which is illustrated in FIG. 16, with the thread 32 and the shank 33 terminates, similar to the screws according to FIGS. 11 to 15, in an end surface, which in this case is configured as a helical surface 53. This end surface 53 extends from the thread flank 54, which forms the rear flank of the thread 32. It is formed by planar truncation of the thread 32. This truncation of the thread 32 forms, between the load flank 57 and the end surface 53, a cutting edge 58 which merges into the thread vertex 40. This truncation begins at the longitudinal edge 55, which extends over the rear flank 57. The end surface 53 continues, via a helix inherent in it, into the lateral surface of the shank 33 at the location 56, where uniformed transition of the end surface 53 into the lateral surface means there is no stepped formation in practice, so that there is no edge depicted at the location 56, which is to be taken as base line of the end surface 53 in FIG. 16 either. The base line 56, which bounds the end surface 53 on one side, runs from the end of the longitudinal edge 55 in the direction of the end of the cutting edge 58.

FIG. 17 illustrates a screw 61 which basically corresponds to those according to FIGS. 11 to 14. This is a screw in the case of which the oblique position of the end surface 62 can be attributed to the fact that the base line 64 runs at an angle, with respect to the direction of slope, which is less than 90°. It is characteristic of the screw 61 according to FIG. 17 that the end surface 62 extends over a relatively long length of the relevant thread turn, to be precise over more than ¼ of a full thread turn. This gives a relatively long cutting edge 65, which facilitates the operation of screwing the screw, in particular, into harder material.

Moreover, this configuration has the advantage that the production process of the screw, namely the cold-rolling operation, is made easier.

In the case of all the abovedescribed screws according to FIGS. 11 to 17, the end surface is inclined such that the vertex of the end surface (point 39 in FIG. 14) follows the base line (line 63 in FIG. 14), to be precise in relation to the screwing-in direction of the screw. This configuration makes it possible, inter alia, as described above, to design the end surface to be particularly long.

FIG. 18 illustrates the screw 47, in the case of which the oblique position of the end surface is selected such that the vertex 66 precedes the base line 67 (depicted by dashed lines). The relevant end of the thread turn thus forms something of an undercut, in the case of which, when the screw 47 is screwed into a component, first of all the vertex 66 comes into contact with the material of the component, as a result of which the cutting edge 68 also takes effect. This configuration of the screw 47 means that, when the screw is screwed into the material of a workpiece, the radially acting force vectors are smaller than in the case of the configuration of the screw according to FIGS. 11 to 17. If, then, it is very important, when the screw according to the invention is used, for the radially directed loading to which the relevant workpiece is subjected by the screw, as the latter is being screwed in, to be particularly low, then the configuration of the screw according to FIG. 18 is particularly advantageous.

FIG. 19 illustrates the screw 69, in the case of which the form of the cutting edge 71 differs from the previously described exemplary embodiments, to be precise the cutting edge 71 runs in relation to the slope of the thread 32 such that it follows a bend, the formation of which reduces the lead angle of the thread 32. The cutting edge 71 is thus, as it were, inflected, in relation to the direction of the thread vertex 40, in the direction of a screw head (not illustrated). Formed alongside the cutting edge 71 are the end surface 72 and the load-flank termination 73, into which the load flank 44 merges. This embodiment of the screw 69 results in the material which is displaced by the cutting edge 71 being displaced in the direction of the rear flank 49.

FIG. 20 shows a modification of the embodiment according to FIG. 19. The screw 70 according to FIG. 20 exhibits the thread 32, of which the thread vertex 40 merges into the cutting edge 74, which in this case, in contrast to the screw 69 according to FIG. 19, bends such that the formation of the cutting edge 74 increases the lead angle of the thread 32. Formed alongside the cutting edge 74 is [sic] the end surface 75 and the rear-flank termination 76, into which the rear flank 49 merges. The embodiment according to FIG. 20 results in the material which is displaced by the cutting edge 74 being displaced in the direction of the load flank 44.

What is claimed is:

1. Cold-rolled screw for screwing into plastic, said screw comprising a self-tapping thread wherein the thread (3) includes a crest and a root and is configured approximately in the manner of a knife blade in cross section, characterized in that at least one flank surface (6, 8; 11/13, 14/15; 17, 18) of the thread (3) has an inwardly directed inflection (5, 16) approximately in a central third of the height of the thread, surfaces of the thread between the inflection (5, 16) and the crest (27) form an outer flank angle (α) of approximately 30°, and surfaces of the thread between the inflection (5, 16) and the root (7) form an inner flank angle (β) which is smaller than the outer flank angle and approximately equal to or greater than ⅓ of the outer flank angle (α).

2. Screw according to claim 1, characterized in that the inflection (5) is provided on only one flank surface (8) of the thread (3).

3. Screw according to claim 1, characterized in that the inflection (5, 16) is provided on both flank surfaces (11/13, 14/15) of the thread (3).

4. Screw according to one of claim 1 characterized in that the outer flank angle (α) bounds the thread (3) symmetrically or non-symmetrically in axial section.

5. Screw according to one of claim 1 characterized in that the flank surfaces (11, 14) in a region of the inner flank angle (β) run rectilinearly in axial section.

6. Screw according to one of claim 1 characterized in that the flank surfaces (19; 20, 21) in the region of the inner flank angle (β) run in a concavely curved manner from the inflection (5, 16).

7. Screw according to one of claim 1 characterized in that the inner flank angle (β) bounds the thread (3) symmetrically or non-symmetrically in axial section.

8. Screw according to one of claim 1 characterized in that the thread includes a base and the flank surfaces (11, 14; 17, 18) in a region of the thread base merge into the thread root (7) in the form of a widening (22, 23; 24, 25) of the thread base, the inner flank angle (β) being increased in the process.

9. Screw according to claim 8, characterized in that the widening of the thread base (22, 23; 24, 25) forms a flank angle which, on average, is greater than the outer flank angle (α).

10. Screw according to claim 8 characterized in that the widening of the thread base (22, 23) runs rectilinearly in axial section.

11. Screw according to claim 8 characterized in that the widening of the thread base (24, 25) runs in a concavely curved manner in axial section.

12. Screw according to one of claim 1 characterized in that the flank surfaces (11/13; 14/15) of the thread (3) have the inwardly directed inflection (5, 16) approximately in the centre.

13. Screw according to one of claim 1 characterized in that the thread (3) with the inflection (5, 16) extends over just part of the thread of the screw.

* * * * *